United States Patent Office 2,723,969
Patented Nov. 15, 1955

2,723,969

THIOFURAMIDES AS ACCELERATORS FOR VULCANIZATION OF NEOPRENE

Ralph A. Naylor, Stamford, and Edwin O. Hook, New Canaan, Conn., assignors to American Cyanamid Company, New York, N. Y., a corporation of Maine No Drawing. Application July 22, 1953,
Serial No. 369,733

14 Claims. (Cl. 260—79.5)

This invention relates to vulcanization of synthetic rubber, products obtained thereby and a novel type of accelerating agent. More particularly, it relates to an improved method of vulcanizing a synthetic elastomer of the type obtained by polymerization and copolymerization of 2-chloro-1,3-butadiene.

The use of accelerating agents to initiate and accelerate the vulcanization of rubber is common practice. Accordingly, extensive investigation has been conducted to find materials having accelerating characteristics. While many materials having such characteristics have been found, the accelerating action initiated by some of these materials occurs much sooner after introduction into the rubber stock than it does with others. The result is prevulcanization or scorching of the stock. Materials preferred for use as accelerators, therefore, are those which exhibit a sufficient period of delay between introduction into the stock and initiation of the accelerating action, but which, at the same time, have such activity as to substantially shorten the time of vulcanization once it has been initiated.

Many of the accelerating materials used with natural rubber fail, for one reason or another, to have the same accelerating action when employed with certain of the synthetic elastomers. This is particularly true in the case of the polymerization and copolymerization products of 2-chloro-1,3-butadiene. Accordingly, it has been necessary to find other materials having the desired accelerating characteristics for use with synthetic elastomers.

Although numerous materials have been found which accelerate vulcanization of the polymerization and copolymerization products of 2-chloro-1,3-butadiene, none has been completely satisfactory for one or more reasons. The primary reason is low scorch time, which results in prevulcanization. Relative lack of raw materials from which some of such materials are derived is another reason. Still another reason is the difficulty in preparation of some of the materials.

There has remained, therefore, a demand for materials suitable for accelerating the rate of vulcanization, in the absence of sulfur, of synthetic elastomers of the type originating from 2-chloro-1,3-butadiene. Such materials should be capable of substantially shortening the period of vulcanization. At the same time, initiation of the accelerating action should be sufficiently delayed after incorporation into the stock to provide an ample margin of processing safety. These accelerators, moreover, should be derived from readily available raw materials and prepared in a simple and inexpensive manner.

In accordance with this invention, a method is provided of accelerating the rate of vulcanization of products produced by polymerization and copolymerization of 2-chloro-1,3-butadiene which comprises adding to the elastomeric stock a controlled amount of a compound selected from thioamides, dithiooxamides and dithiosuccinamides containing at least one

grouping and represented by the formulae

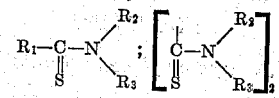

and

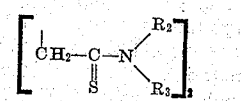

in which $R_1$ is a radical selected from the group consisting of H, ethoxy, phenyl and furyl; $R_2$ and $R_3$ are radicals selected from the group consisting of H, alkyls of 1–8 carbon atoms, allyl, phenyl, naphthyl and cyclohexyl; and in which $R_2$ and $R_3$ together form with the nitrogen a radical selected from the group consisting of morpholyl, pyrrolidyl and piperidyl.

Among the preferred compounds of this invention are thiofuramide, thiobenzamide, xanthogenamide, dithiooxamide and dithiosuccinamide; N-substituted derivatives thereof, for example, the methyl, ethyl, propyl, butyl, octyl, cyclohexyl, phenyl, and the like derivatives; and N,N and N,N' di-substituted derivatives such as diethyl, dibutyl, diisopropyl, dicyclohexyl, oxydiethylene, cyclotetramethylene, cyclopentmethylene and the like.

Preparation of the compounds may be by any method, the particular method of preparation forming no part of this invention. For example, thioamides may be formed by heating an amine salt of a dithio compound in the presence of an excess of the amine to drive off hydrogen sulfide. Thioamides may also be formed by reacting in water at room temperature the ammonium salt of a dithio compound with an excess of the amine. Dithiodisulfides may be reacted with an amine in the presence of ether to form thioamides. Dithiooxamides may be formed by reacting glyoxal with sulfur and an amine. Dithiosuccinamides may be formed by reacting succinonitrile, hydrogen sulfide and an amine.

The following examples illustrate preparation of the compounds of this invention. All parts are by weight unless otherwise noted.

EXAMPLE 1

*Thiofuramide*

33 parts of ammonium dithiofuroate and 40 parts of aqueous ammonia were heated at 125–128° C. and 1000 p. s. i. for one hour. The crude product was recrystallized from hot water, M. P. 124°–127° C.

EXAMPLE 2

*N-cyclohexythiofuramide*

To 321 parts of cyclohexylamine dithiofuroate was added 433 parts of cyclohexylamine. The mixture was heated for one hour at 120° C. after which excess amine was vacuum distilled leaving a crystalline solid. On recrystallization from 75% aqueous alcohol the product was obtained as a yellow solid, M. P. 78°–80° C.

EXAMPLE 3

*N-cyclohexylthiobenzamide*

A mixture of 126 parts of cyclohexylamine dithiobenzoate and 99 parts of cyclohexylamine were refluxed for 20 minutes. Excess amine was vacuum distilled leaving an oily product which crystallized. Recrystallization from 60% alcohol gave a yellow crystalline material having an M. P. of 88.5°–89.5° C.

We claim:

EXAMPLE 4

*N,N-cyclotetramethylenethiofuramide*

To a solution comprising 30 parts of ammonium dithiofuroate in 300 cc. of water was added 31.3 parts of pyrrolidine at room temperature. The mixture was stirred for 30 minutes and allowed to stand overnight, resulting in the formation of a solid material. Recrystallization from 60% alcohol gave the product in the form of yellow needles, M. P. 67°–68° C.

EXAMPLE 5

*N,N-oxydiethylenethiofuramide*

A mixture of 32.2 parts of ammonium dithiofuroate and 87 parts of morpholine was heated at 130–135° C. for 30 minutes. Excess morpholine was vacuum distilled leaving a crystalline material. Recrystallization from aqueous alcohol gave a pale yellow solid, M. P. 64°–65° C.

EXAMPLE 6

*Xanthogenamide*

81.8 parts of ethyl bromide was added to a suspension of sodium ethyl xanthate in methyl isobutyl ketone. The reaction mixture was stirred for one hour at room temperature, heated to 95° C. and stirred for one hour, after which it was cooled and filtered. The filtrate was stripped of solvent, and the residue was dissolved in ethanol and charged with gaseous ammonia. After stirring overnight, ethyl mercaptan and solvent were distilled off, leaving a residue which crystallized. Recrystallization gave white crystals melting at 36°–39° C.

EXAMPLE 7

*N-cyclohexylxanthogenamide*

A solution of 50 parts of cyclohexylamine in 500 parts of ether was added with stirring at 20–30° C. to a solution of 60.5 parts xanthogen disulfide in 200 parts ether. A crystalline salt formed and was filtered. The filtrate was stripped of solvent ether, leaving a residue which crystallized on cooling. Recrystallization from petroleum ether gave a white material, M. P. 47°–50° C.

EXAMPLE 8

*N,N'-diisopropyldithiooxamide*

29 parts glyoxal as a 30.5% aqueous solution, 32 parts sulfur, and 54 parts isopropylamine were reacted in 150 parts benzene containing 15 parts isopropanol at 71°–85° C. Water was removed by azeotropic distillation. Reaction was continued for 15 hours at 80° C. Solvent was then distilled off and crude product recrystallized from isopropanol, M. P. 101° C.

EXAMPLE 9

*N,N'-dicyclohexyldithiooxamide*

29 parts glyoxal as a 30.8% aqueous solution, 32 parts sulfur, and 99 parts cyclohexylamine were heated at 80° C. in benzene. Water was removed by azeotropic distillation. On cooling, the product precipitated as an orange-colored solid, M. P. 145°–147° C.

EXAMPLE 10

*N,N'-diethyldithiooxamide*

The procedure of Example 8 was followed, replacing isopropylamine with an equimolar amount of ethylamine.

EXAMPLE 11

*N,N'-dibutyldithiooxamide*

The procedure of Example 8 was again followed substituting an equimolar amount of butylamine for isopropylamine.

EXAMPLE 12

*N,N'-diisopropyldithiosuccinamide*

8 parts of succinonitrile and 16 parts of isopropylamine were charged to an autoclave with 90 parts of 2B alcohol. The mixture was saturated with H₂S at 5° C. and then heated at 120° C. for eight hours. Stripping of solvent alcohol produced a white crystalline product, M. P. 126°–128° C.

The above compounds and 2-mercaptoimidazoline, at present probably the best accelerator commercially available for use with the polymerization and copolymerization products of 2-chloro-1, 3-butadiene, were compounded into sulfur-free compositions having the following base formula:

| Ingredients: | Parts by weight |
|---|---|
| Neoprene type W | 100 |
| Phenyl alpha naphthylamine | 2 |
| Stearic acid | 0.5 |
| Light calcined magnesia | 2 |
| SRF black | 29 |
| Zinc oxide | 5 |
| Accelerator | 0.5 |

Samples of the compositions were treated in a Mooney viscometer at 250° F. to determine for each the scorch time, i. e., the time needed to attain a reading 10 points above the minimum. Other samples were given a twenty-five minute cure and subjected to a compression test to determine the percentage set. Still other samples were cured for twenty minutes at 153° C. and tested to determine tensile data.

The following composite table gives the results obtained:

TABLE

| Accelerator | Mooney Scorch at 250° F. (Min.) | Compression Set After 25 Min. Cure (percent) | Tensile Data | | |
|---|---|---|---|---|---|
| | | | Modulus at Elongation of 300% (lbs./in.²) | Tensile Strength at break (lbs./in.²) | Elongation at break (percent) |
| 2-mercapto-imidazoline | 12 | 23.6 | 1,450 | 3,475 | 530 |
| Thiofuramide | 16 | 20.4 | 1,450 | 3,400 | 540 |
| N-Cyclohexyl-thiofuramide | 90 | 33.6 | 1,050 | 3,600 | 640 |
| N,N-Oxydiethylene-thiofuramide | 66 | 31.7 | 1,125 | 3,275 | 630 |
| N,N-Cyclo-tetramethylene-thiofuramide | 27 | 23.2 | 1,275 | 3,100 | 540 |
| N-Cyclohexylthio-benzamide | over 77 | 29.6 | 1,100 | 3,500 | 640 |
| Xanthogenamide | 16 | 28.2 | 1,300 | 3,400 | 570 |
| N-Cyclohexyl-xanthogenamide | 52 | 36.7 | 1,150 | 3,400 | 620 |
| N,N'-Diethyldithiooxamide | 80 | 28.3 | 1,100 | 3,200 | 620 |
| N,N'-Dibutyldithiooxamide | 30 | 27 | 1,250 | 3,450 | 610 |
| N,N'-Diisopropyl-dithiooxamide | 27 | 33.4 | 1,250 | 3,400 | 600 |
| N,N'-Dicyclohexyl-dithiooxamide | 22 | 33.5 | 1,225 | 3,575 | 620 |
| N,N'-Diisopropyl-dithiosuccinamide | 10 | 24 | 1,400 | 3,200 | 530 |

We claim:

1. A composition obtained by milling together an unvulcanized, vulcanizable synthetic elastomer selected from the group consisting of polymerization and copolymerization products of 2-chloro-1, 3-butadiene and at least about 0.5% of the elastomer of a thioamide containing at least one

grouping and represented by the formulae

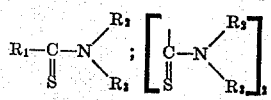

and

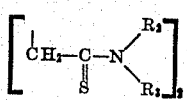

in which $R_1$ is a radical selected from the group consisting of H, ethoxy, phenyl and furyl; $R_2$ and $R_3$ are radicals selected from the group consisting of H, alkyls of 1–8 carbon atoms, allyl, phenyl, naphthyl and cyclohexyl; and in which $R_2$ and $R_3$ together form with the nitrogen a radical selected from the group consisting of morpholyl, pyrrolidyl and piperidyl.

2. A composition according to claim 1 in which the accelerator is a thioamide.

3. A composition according to claim 2 in which the thioamide is thiofuramide.

4. A composition according to claim 2 in which the thioamide is N,N-cyclotetramethylenethiofuramide.

5. A composition according to claim 1 in which the accelerator is a dithiooxamide.

6. A composition according to claim 5 in which the dithiooxamide is N,N'-dibutyldithiooxamide.

7. A composition according to claim 1 in which the accelerator is a dithiosuccinamide.

8. A method of vulcanizing, in the absence of sulfur, a synthetic elastomer selected from the group consisting of polymerization and copolymerization products of 2-chloro-1, 3-butadiene which comprises milling together a mixture of said elastomer and at least about 0.5% of the elastomer of a thioamide containing at least one

grouping and represented by the formulae

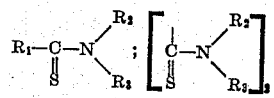

and

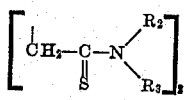

in which $R_1$ is a radical selected from the group consisting of H, ethoxy, phenyl and furyl; $R_2$ and $R_3$ are radicals selected from the group consisting of H, alkyls of 1–8 carbon atoms, allyl, phenyl, naphthyl and cyclohexyl; and in which $R_2$ and $R_3$ together form with the nitrogen a radical selected from the group consisting of morpholyl, pyrrolidyl and piperidyl; and subjecting said mixture to heat for sufficient time to establish the cure of the elastomer.

9. A method according to claim 8 in which the accelerator is a thioamide.

10. A method according to claim 9 in which the thioamide is thiofuramide.

11. A method according to claim 9 in which the thioamide is N,N-cyclotetramethylenethiofuramide.

12. A method according to claim 8 in which the accelerator is a dithiooxamide.

13. A method according to claim 12 in which the dithiooxamide is N,N'-dibutyldithiooxamide.

14. A method according to claim 8 in which the accelerator is a dithiosuccinamide.

No references cited.